(12) United States Patent
Nagasaka et al.

(10) Patent No.: US 7,797,714 B1
(45) Date of Patent: Sep. 14, 2010

(54) INFORMATION PROCESSING APPARATUS FOR SEARCHING BROADCAST PROGRAM AND METHOD THEREFORE

(75) Inventors: Mitsuru Nagasaka, Kanagawa (JP); Tomoko Oyabu, Kanagawa (JP); Aki Koyabu, Tokyo (JP); Tomoyuki Hanai, Kanagawa (JP)

(73) Assignee: Sony Corporation, Tokyo (JP)

( * ) Notice: Subject to any disclaimer, the term of this patent is extended or adjusted under 35 U.S.C. 154(b) by 903 days.

(21) Appl. No.: 09/614,024

(22) Filed: Jul. 11, 2000

(30) Foreign Application Priority Data

Jul. 12, 1999 (JP) ................................. 11-197770

(51) Int. Cl.
*G06F 3/00* (2006.01)
*G06F 7/00* (2006.01)
*G06F 13/00* (2006.01)
*G06F 3/048* (2006.01)
*G06F 3/033* (2006.01)
*H04N 5/445* (2006.01)

(52) U.S. Cl. ............................. 725/53; 725/61; 725/58; 707/706; 715/856; 345/157

(58) Field of Classification Search .................... 725/53, 725/61, 58; 707/706; 715/856; 345/157
See application file for complete search history.

(56) References Cited

U.S. PATENT DOCUMENTS

| | | | | |
|---|---|---|---|---|
| 5,819,261 A * | 10/1998 | Takahashi et al. | ............... | 707/3 |
| 5,895,462 A * | 4/1999 | Toki | ............................. | 707/3 |
| 6,005,565 A * | 12/1999 | Legall et al. | ................. | 715/721 |
| 6,008,803 A * | 12/1999 | Rowe et al. | ................... | 715/721 |
| 6,075,526 A * | 6/2000 | Rothmuller | .................. | 345/721 |
| 6,133,909 A * | 10/2000 | Schein et al. | ................ | 345/721 |
| 6,216,264 B1 * | 4/2001 | Maze et al. | .................... | 725/53 |
| 6,263,501 B1 * | 7/2001 | Schein et al. | ................. | 725/39 |
| 6,335,742 B1 * | 1/2002 | Takemoto | .................... | 715/781 |
| 6,415,099 B1 * | 7/2002 | Berger | .......................... | 386/83 |
| 6,519,584 B1 * | 2/2003 | Tognazzini et al. | ............ | 707/3 |
| 6,865,746 B1 * | 3/2005 | Herrington et al. | ............ | 725/53 |
| 2002/0054752 A1 * | 5/2002 | Wood et al. | .................... | 386/83 |
| 2002/0065814 A1 * | 5/2002 | Okamoto et al. | ............... | 707/3 |
| 2003/0115603 A1 * | 6/2003 | Lemmons et al. | .............. | 725/53 |

FOREIGN PATENT DOCUMENTS

| | | |
|---|---|---|
| JP | 7-135621 | 5/1995 |
| JP | 10-136318 | 5/1998 |
| JP | 10 243309 | 9/1998 |
| JP | 11 252477 | 9/1999 |

* cited by examiner

*Primary Examiner*—Hoang-Vu A Nguyen-Ba
(74) *Attorney, Agent, or Firm*—Frommer Lawrence & Haug LLP; William S. Frommer; Thomas F. Presson

(57) ABSTRACT

When a viewer (listener) wants to search a particular broadcast programs on a receiver, a keyword search processing is executed to an EPG (Electronic Program Guide) data. In this case, a search key for the keyword search processing is able to be registered by selecting a user preference keyword among EPG data displayed on a monitor screen of the receiver. Upon selecting user preference keywords, the viewer (listener) controls a cursor by a remote commander, and thus selected user preference keywords can be stored in a memory of the receiver. These user preference keywords in the memory are used as search key for searching favorite programs among daily updated EPG data.

13 Claims, 16 Drawing Sheets

FIG. 3

| PROGRAM ID | PROGRAM ID DATA (CODE) |
|---|---|
| CHANNEL | CHANNEL DATA (CODE) |
| STATION | TEXT DATA |
| START TIME | TIME DATA |
| LENGTH (END TIME) | TIME DATA |
| TITLE | TEXT DATA |
| SUB-TITLE | TEXT DATA |
| CONTENTS | TEXT DATA |
| GENRE | GENRE DATA (CODE) |

| WEEKLY PROGRAM GUIDE   FEB.7 (MONDAY) |

| | JAPAN TV | KBS | SEA TV |
|---|---|---|---|
| 20: | 00<br>BEST 10 SONG | | 00<br>DR. NO |
| 21: | 00<br>TONTA'S TRIP | 00<br>GOSSIP DREAM | 00<br>(DRAMA) |
| 22: | | 00<br>SEA-SHORE<br>IN JAPAN | |
| 23: | 00<br>SUCCOR<br>(LIVE) | | 00 |

FIG. 7

WEEKLY PROGRAM GUIDE    FEB.7 (MONDAY)

| | JAPAN TV | KBS | SEA TV |
|---|---|---|---|
| 20: | 00<br>BEST 10 SONG | | 00<br>DR. NO |
| 21: | 00<br>TONTA'S TRIP | 00<br>GOSSIP DREAM | 00<br>(DRAMA) |
| 22: | | 00<br>SEA-SHORE IN JAPAN | |
| 23: | 00<br>SUCCOR<br>(LIVE) | | 00 |

FEB. 7(MON) 23:00~3:00  JAPAN TV   SUCCOR LIVE
▽ J-LEAGUE [SHANON VS PERUSA] (BS-LIVE)
GUEST: Mr. ROMANO AND Mr. FRANKO

| WEEKLY PROGRAM GUIDE | FEB.7 (MONDAY) |

|      | JAPAN TV | KBS | SEA TV |
|------|----------|-----|--------|
| 20:  | 00 BEST 10 SONG | | 00 DR. NO |
| 21:  | 00 TONTA'S TRIP | 00 GOSSIP DREAM | 00 (DRAMA) |
| 22:  | | 00 SEA-SHORE IN JAPAN | |
| 23:  | 00 SUCCOR (LIVE) | | 00 |

FEB. 7(MON) 23:00~3:00   JAPAN TV   SUCCOR LIVE
▽ J-LEAGUE [ SHANON VS PERUSA ] (BS-LIVE)
GUEST: Mr. ROMANO AND Mr. FRANKO

FIG. 12

KEYWORD SEARCH
SELECT KEYWORD FOR SEARCH

| NEWS SATELLITE | BOXING |
| BL | PERUSA |
| DOMESTIC MOVIE | |
| MIE HAMA | SEARCH EXECUTE |

FIG. 13

KEYWORD SEARCH
SELECT KEYWORD FOR SEARCH

| NEWS SATELLITE | BOXING |
| BL | PERUSA |
| DOMESTIC MOVIE | |
| MIE HAMA | SEARCH EXECUTE — 62 |

FIG. 14

SEARCH RESULT

HIT 2

MAR. 4, CH3 21:00-23:00
SERIO A [ROTIO VS PERUSA]

MAR. 7, CH12 00:00-00:30
SUCCOR DIGEST BY NAGATA [PERUSA]

KEYWORD SEARCH
SELECT KEYWORD FOR SEARCH

| NEWS SATELLITE | BOXING |
|---|---|
| BL | PERUSA |
| DOMESTIC MOVIE | |
| MIE HAMA | DELETE EXECUTE |

64

INFORMATION PROCESSING APPARATUS FOR SEARCHING BROADCAST PROGRAM AND METHOD THEREFORE

BACKGROUND OF THE INVENTION

1. Field of the Invention

This invention relates to a broadcast information receiving and displaying apparatus and the method. The invention may be used to an apparatus and the method which can display a broadcast image corresponding to the received broadcast signal transferred from a broadcast station.

2. Description of the Related Art

Generally, a broadcast station gives a broadcast service by using an analog type broadcast signal transferred on a grand wave, and the broadcast station transfers own broadcast program within a predetermined frequency band that is assigned to the broadcast station itself.

A broadcast receiver (is called as IRD: Integrated Receiver Decoder) that is located in a viewer's home selects a desired broadcast program on a desired channel from a plurality of programs on a plurality of channels corresponding to the channel selecting operation, and then the receiver decodes the selected broadcast program on the selected channel to display on a monitor.

By the way, in the broadcast system as explained above it is proposed to regularly transfer data from the predetermined broadcast station into the receiver in the viewer's home for a purpose of informing about the broadcast programs provided from the broadcast station, and the data indicates contents of the broadcast programs and is called as electric program guide information (EPG).

This EPG data includes a title of a broadcast program, a channel number for the broadcast program, a broadcast time of the broadcast program and explanation or contents of the broadcast program and so on.

The viewer (listener) is able to decide favorite one of broadcast programs to watch based on the electronic broadcast program guide information displayed on the display screen of the monitor.

In this case, the IRD receiver regularly receives this EPG data transmitted from the predetermined broadcast station, and stores thus received EPG data in a memory of the IRD receiver. Thus memorized EPG data is read out from the memory by the operation of the viewer (listener) and is displayed on the display screen of the monitor.

The viewer (listener) checks or searches the displayed EPG data on the display screen and decides one or more of the broadcast program to watch.

By the way, as the EPG data contains a plenty of broadcast program information of various broadcast stations, the display screen of the monitor for the IRD receiver can not display all of the EPG data at a time because of the limited size of the display screen.

Accordingly, the viewer (listener) has to scroll or change the displayed image of the EPG data in order to find out favorite broadcast program among various broadcast programs. This scrolling operation or changing operation is very complex and tiresome to the viewer (listener).

In order to avoid such complex operation upon finding the favorite broadcast program, a keyword search processing is proposed to use in finding out favorite broadcast program among various broadcast programs using the EPG data. Namely, one or more of search keys for the viewer (listener) is previously registered in the IRD receiver and thus registered search key is used to search favorite information among the EPG data.

Thus searched broadcast program data is displayed on the display screen of the monitor. In this case, the predetermined broadcast station transmits pre-selected words suitable for keywords decided by the broadcast station within the EPG data, and when the IRD receiver receives these pre-selected words, the IRD receiver registers in a memory these words as keywords. Alternatively, the IRD receiver picks up words among the EPG data based on a predetermined general rule for keywords, and registers thus picked up words as keywords.

In the above mentioned two cases for registration of keywords, it is impossible to register keywords particularly related to the viewer (listener)'s preference, so that the viewer (listener) can not search or find his or her favorite broadcast program among various broadcast programs.

Accordingly, if the viewer (listener) wants to find out broadcast program based on personality and to generate as keywords at the IRD receiver, the broadcast station has to prepare these keywords for personality and to generate in addition to explanation data for the broadcast program in advance and has to transmit these keywords.

In order to register keywords for the viewer (listener), it is possible to use key board to enter and register keywords in the memory of the IRD receiver, but this is very complex and tiresome to prepare a keyboard and to enter the viewer (listener)'s favorite keywords through the keyboard by the viewer (listener).

SUMMARY OF THE INVENTION

It is a primary object of the present invention to propose a new information processing apparatus for searching broadcast programs.

It is a secondary object of the present invention to propose a novel information processing apparatus for searching broadcast programs using the EPG data transmitted regularly from broadcast station.

It is further object of the present invention to propose a novel broadcast receiver in which a viewer (listener) is able to enter an user preference keyword by selecting words from the EPG data displayed on a monitor without using a keyboard. The viewer (listener) is able to find a favorite program among a large number of broadcast programs by searching the EPG data with the user preference keyword.

Namely, according to the present invention, an information processing apparatus for searching broadcast programs comprises first memory means for storing broadcast program information related to broadcast programs, monitor means for displaying the broadcast program information stored in the memory means, designating means for designating particular part of the broadcast program information displayed on the display means, pick up means for picking up the particular part of the broadcast program information designated by the designation means and second memory means for storing the picked up particular part of the broadcast program information as one of search keys.

In the another aspect of the present invention, the information processing apparatus for searching broadcast programs further comprises search means for searching the broadcast program information stored in the first memory means based on the picked up particular part of the broadcast program information stored in the second memory means.

In the information processing apparatus of the present invention, the display means displays a search result done by the searching means. The information processing apparatus of the present invention may further comprises means for recording and/or reproducing broadcast programs related to a search result done by the searching means. In the information processing, the broadcast program information is preferably transmitted regularly from a predetermined broadcast station.

In the another aspect of the present invention, a new method for processing broadcast program information in order to search broadcast programs comprises the steps of storing broadcast program information related to broadcast programs in a first memory, displaying the broadcast program information stored in the first memory on a display screen designating particular part of the broadcast program information displayed on the display screen, picking up the particular part of the broadcast program information designated at the designation step, and storing the picked up particular part of the broadcast program information in a second memory as one of search keys.

Further in the method for processing broadcast program information of this invention further comprises a step for searching the broadcast program information stored in the first memory based on the picked up particular part of the broadcast program information stored in the second memory. In the method for processing broadcast program of the present invention, further comprises a step for displaying a search result done at the searching step. The method for processing broadcast program of this invention further comprises a step for recording the broadcast programs related to a search result done by the searching step.

According to the present invention, a viewer (listener) can designate desired word among displayed EPG data on the monitor screen, and stores or registers thus selected word in a memory as search key for later searching. Namely, without preparing a keyboard, the viewer (listener) can enter or register a search key by cursor operation on the display screen, so that total cost for the IRD receiver is saved and the operation of the search key registration is easy.

Here in below, preferred embodiments of this invention are explained in detail with reference to drawings. Namely, the examples described here in after are the best mode of embodiments of this invention, therefore there are technically suitable various limitations, but the scope of this invention is not affected by these limitations unless there is a description about restriction of this invention in the explanation below.

BRIEF DESCRIPTION OF THE DRAWINGS

FIG. 3 is a content of an EPG data.

FIGS. 6 to 10 are conceptual display images on a display screen showing various situations of a broadcast program guide of the EPG data.

FIGS. 12 and 13 are conceptual display images on a display screen showing a key word search image.

FIG. 14 is a conceptual display image on a display screen showing search result image.

FIG. 15 is a conceptual display image on a display screen showing key word cancel image.

DETAILED DESCRIPTION OF THE PREFERRED EMBODIMENTS

Figure 1:
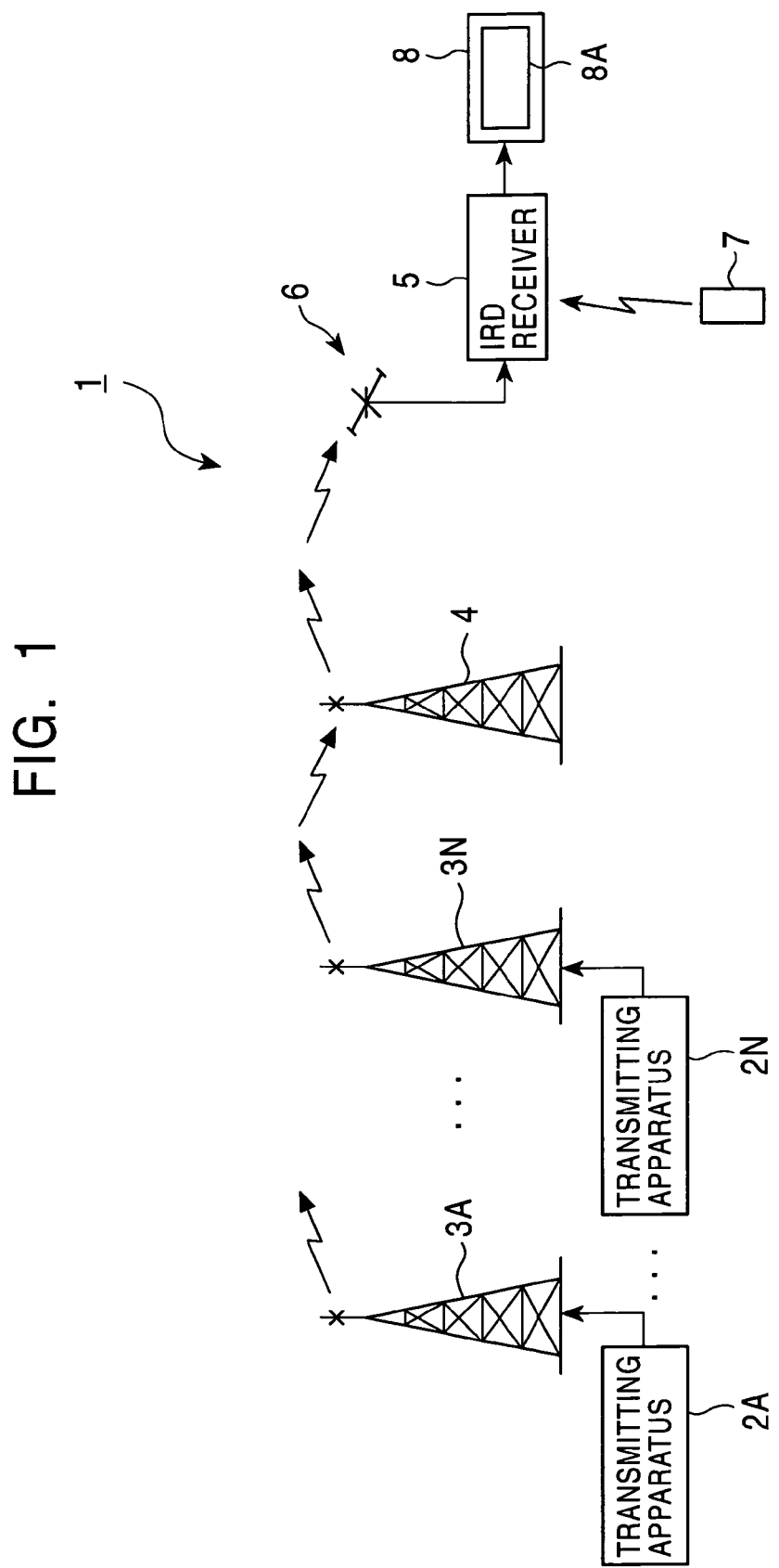
FIG. 1 is a conceptual drawing designating an analog type ground wave broadcast system to be used in this invention.

With reference to the attached drawings, preferred embodiments of the present invention is explained here in below.

1) A Construction of an Analog Type Ground Wave Broadcasting System

A reference numeral 1 shows a construction of the analog type ground wave broadcasting system as a whole, and each transmitting apparatus 2A to 2N inclusive belonging to respective broadcast stations transmits a video signal and an audio signal of a broadcast program from transmitting antennas 3A to 3N inclusive. A repeater station 4 relays broadcast waves transmitted from the transmitting apparatus 2A to 2N, and supplies the broadcast waves to an IRD (Integrated Receiver and Decoder) receiver 5 installed in each of TV viewer (listener)'s home.

The IRD receiver 5 receives the broadcast waves from a plurality of broadcast stations at a receiving antenna 6, and a viewer (listener) selects favorite broadcast program data by a remote commander 7 among received broadcast program data from the transmitting antennas 3A to 3N of the broadcast stations. Thus selected broadcast program data is demodulated and displayed on a display screen 8A of a monitor 8.

2) A Construction of the IRD Eeceiver 5

Figure 2:
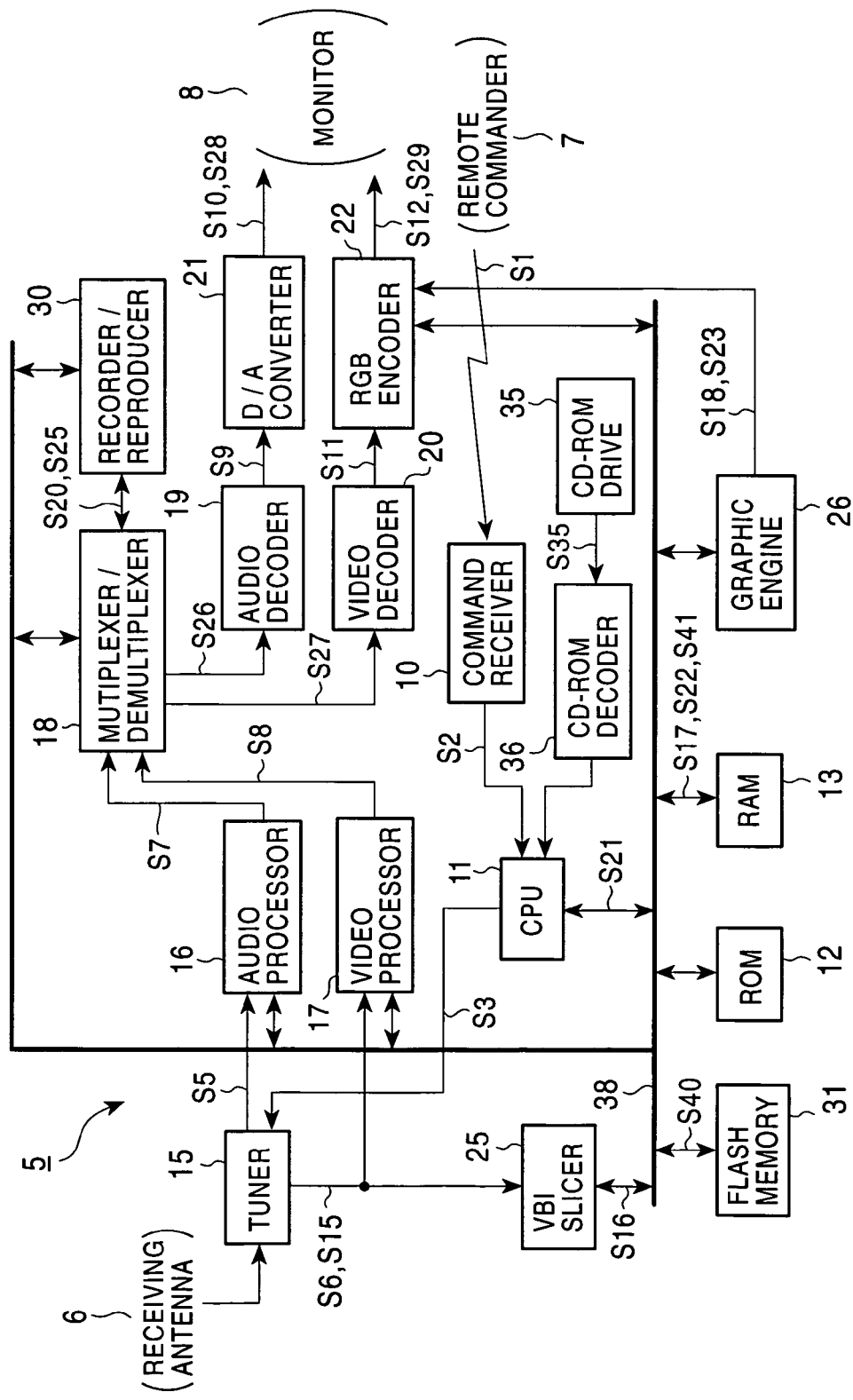
FIG. 2 is a block diagram showing one example of an IRD receiver to which this invention is applied.

As shown in FIG. 2, the IRD receiver 5 receives an infra-red command signal S1 superimposed on an infra-red carrier transmitted from the remote commander 7 (FIG. 1) at a command receiver 10. Thus received infra-red command signal S1 is converted into an electrical command signal S2 and then this command signal S2 is supplied to a CPU (Central Processing Unit) 11.

The CPU 11 reads out a control program stored in a ROM (Read Only Memory) 12, and thus read out control program is transferred to a RAM (Random Access Memory) 13. The CPU 11 executes the control program stored in the RAM 13 to control all operation of circuits of the IRD receiver 5.

The CPU 11 then analyzes the electrical command signal S2 supplied from the command receiver 10 of the IRD receiver 5, and if channel selecting operation is done by the viewer (listener) through the remote commander 7 (FIG. 1), the CPU 11 generates a channel selection signal S3 according to the channel selecting operation of the viewer (listener) and supplies this channel selection signal S3 to a tuner 15.

The tuner 15 selects a broadcast wave of the selected channel or the broadcast station among broadcast waves received by the receiving antenna 6 (FIG. 1) in accordance with the channel selection signal S3. The tuner 15 then generates an audio signal S5 and a video signal S6 by demodulating the broadcast wave of the selected channel and supplies these audio signal S5 and video signal S6 to an audio processor 16 and a video processor 17, respectively.

The audio processor 16 converts the audio signal S5 into a coded audio data S7 by a compression coding based on the MPEG (Moving Picture Experts Group) format after analog to digital conversion. Thus obtained coded audio data S7 is then supplied to an audio decoder 19 by way of a multiplexer/demultiplexer 18.

On the contrary, the video processor 17 converts the video signal S6 into a coded video data S8 by a compression coding based on the MPEG format after analog to digital conversion. Thus obtained coded video data S8 is then supplied to an video decoder 20 by way of the multiplexer/demultiplexer 18.

Further an audio decoder 19 decompresses and demodulates the coded audio data S7 and generates an audio data S9. This audio data S9 is supplied to a D/A (Digital to Analog) converter 21, and an audio signal S10 from the D/A converter 21 is then supplied to the monitor 8 (FIG. 1).

A video decoder 20 decompresses and demodulates the coded video data S8 and generates a video data S11. This video data S11 is supplied to a RGB (red, green and blue) encoder 22. The RGB encoder 22 encodes the supplied video data S11 into a luminance signal and a chrominance signal of the NTSC (National Television System Committee) standard, and then generates a video signal S12 to be supplied to the monitor 8 (FIG. 1).

Thus video images of the broadcast program selected by the viewer (listener) is displayed on the display screen 8A of the monitor 8 and an audio sound of the broadcast program selected by the viewer (listener) is outputted from a speaker (not shown) of the monitor 8.

By the way, in the analog type ground wave broadcasting system, predetermined one of broadcast stations delivers electronic broadcast program guide information for all broadcast stations. This electronic broadcast program guide information is called as an EPG (Electronic Program Guide) data and is delivered regularly once a week or month, for example. This EPG data is generated relating to each of broadcast programs of all broadcast stations. The EPG data includes, as shown in FIG. 3, a broadcast program ID (Identification) inherent to each broadcast program, a channel number of the broadcast program, a name of the broadcast station, a start time of the broadcast program, a length of a broadcast program, a title of the broadcast program, a sub-title of the broadcast program, detailed contents of the broadcast program and a genre of the broadcast program. The viewer (listener) decides a favorite one of broadcast programs to watch based on this EPG data displayed on the display screen 8A of the monitor 8.

In this case, the broadcast program ID, the channel number and the genre are expressed by code data, and the station name, the title of the broadcast program, the sub-title of the broadcast program and the contents are expressed by text data. The start time and the length of the broadcast program are time data.

The transmitting apparatus 2A, for example, installed in the predetermined broadcast station transmits the EPG data for one week in the VBI (Vertical Blanking Interval) of the video signal regularly once a day during mid-night or early in the morning, for example.

In this case, the tuner 5 of the IRD receiver 5 picks up the broadcast wave on which the EPG data are superimposed among broadcast waves received by the receiving antenna 6. Further the tuner 5 demodulates thus picked up broadcast wave and generates a video signal S15 that is supplied to a VBI slicer 25. The VBI slicer 25 extracts an EPG data S16 from the video signal S15 and this EPG data S16 is supplied to a RAM 13 through a bus 38. Thus the IRD receiver 5 revises the EPG data S16 stored in the RAM 13 every day, and the latest EPG data S16 is always stored in the RAM 13.

When the viewer (listener) operates the remote commander 7 to display an EPG image, the remote commander 7 transmits the infra-red command signal S1 to the command receiver 10. The command receiver 10 converts the received infra-red command signal S1 into the electrical command signal S2 and supplies this electrical command signal S2 to the CPU 11. When the CPU 11 receives the electrical command signal S2 from the command receiver 10, the CPU 11 starts to apply a graphic processing to the EPG data S16 on the RAM 13 based on a dictionary data such as characters and marks stored in the ROM 12, and generates an EPG image data S17. This EPG image data S17 is supplied to the graphic engine 26 by way of the bus 38.

The graphic engine 26 converts the EPG image data S17 into a luminance signal and a chrominance signal of the NTSC standard and generates an EPG video signal S18 by applying a digital to analog conversion. The EPG video signal S18 is then supplied to the RGB encoder 22. The RGB encoder 22 superimposes the EPG video signal S18 on a video signal S12 and supplies to the monitor 8. Accordingly an EPG image corresponding to the EPG video signal S18 is displayed on the display screen 8A of the monitor 8.

By the way, when the viewer (listener) operates the remote commander 7 for recording audio and video signals of the selected broadcast program, the remote commander 7 transmits the infra-red command signal S1 for recording to the command receiver 10. The command receiver 10 converts the infra-red command signal S1 into the electrical command signal S2 and supplies this electrical command signal S2 to the CPU 11.

When the CPU 11 receives the electrical command signal S2 for recording broadcast program selected by the remote commander 7, the CPU 11 controls proper circuits of the IRD receiver 5 for recording the audio and video signals of the broadcast program through the bus 38. Namely, the multiplexer/demultiplexer 18 multiplexes the coded audio data S7 and the coded video data S8 and generates a multiplexed data S20. Thus generated multiplexed data S20 is supplied to the recorder/reproducer 30 for recording on a recording medium (not shown) such as magnetic recording medium, an optical recording medium and so on.

When the recording time for the broadcast program selected by the viewer (listener) is over, the CPU 11 generates a recording title list data S21 based on the EPG data S16 previously stored in the RAM 13 and stores this recording title list in the flash memory 31. In this case, the recording title list data S21 generally includes a title list of the broadcast programs recorded at the recorder/reproducer 30.

The CPU 11 revises the recording title list data S21 at each time when a new broadcast program is recorded at the recorder/reproducer 30, so that the latest recording title list data S21 is always stored in the flash memory 31.

In this case when the viewer (listener) operates the remote commander 7 to display a recording title list image, the remote commander 7 transmits the infra-red command signal S1 for displaying the recording title list image to the command receiver 10. The command receiver 10 converts the infra-red command signal S1 into electrical command signal S2 and supplies this electrical command signal S2 to the CPU 11. When the CPU 11 receives this electrical command signal S2, the CPU 11 reads out the recording title list data S21 from the flash memory 31 and supplies thus read out recording title list data S21 to the RAM 13.

The CPU 11 then applies a graphic processing to the recording title list data S21 on the RAM 13 based on the dictionary data such as characters and marks stored in the ROM 12, and generates a recording title list image data S22. This recording title list image data S22 is supplied to the graphic engine 26 by way of the bus 38.

The graphic engine 26 converts thus supplied recording title list image data S22 into a luminance signal and a chrominance signal of the NTSC standard and generates a recording title list video signal S23 by applying a digital to analog conversion. The recording title list video signal S23 is then supplied to the RGB encoder 22. The RGB encoder 22 superimposes the recording title list video signal S23 on the video signal S12 and supplies to the monitor 8. Accordingly a recording title list image corresponding to the recording title list video signal S23 is displayed on the display screen 8A of the monitor 8.

The viewer (listener) checks the recording title list displayed on the display screen 8A of the monitor 8 and operates the remote commander 7 to reproduce favorite broadcast program previously recorded on the recording medium by said recorder/reproducer 30. Then the remote commander 7 transmits the infra-red command signal S1 for reproduction to the command receiver 10. The command receiver 10 converts the received infra-red command signal S1 into the electrical command signal S2 and supplies this electrical command signal S2 to the CPU 11.

When the CPU 11 receives this electrical command signal S2 for reproduction selected by the remote commander 7, the CPU 11 controls proper circuits of the IRD receiver 5 for reproducing the audio and video signals of the broadcast program selected through the bus 38. Namely, the recorder/reproducer 30 reproduces a multiplexed data S25 of the designated broadcast program among a plurality of multiplexed data for broadcast programs recorded on the recording medium at the recorder/reproducer 30. The multiplexed data S25 is then supplied to the multiplexer/demultiplexer 18, wherein the multiplexed data S25 is demultiplexed into the coded audio data S26 and the coded video data S27, respectively.

Further the audio decoder 19 decompresses and demodulates the coded audio data S26 and supplies to the D/A (Digital to Analog) converter 21 which generates an audio signal S28, and this audio signal S21 is then supplied to the monitor 8 (FIG. 1). The video decoder 20 decompresses and demodulates the coded video data S27 and supplies to the RGB (red, green and blue) encoder 22. The RGB encoder 22 encodes decompressed and demodulated coded video data S27 into a luminance signal and a chrominance signal of the NTSC (National Television System Committee) standard, and generates a video signal S29 to be supplied to the monitor 8 (FIG. 1).

A CD-ROM (Compact Disc Read Only Memory) drive 35 reads out data for broadcast program logo and pictures of personalities relating to a regular broadcast program from a specially made CD-ROM and supplies these read out data to a CD-ROM decoder 36. The CD-ROM decoder 36 decodes these data as broadcast program imagination data S35 and the CPU 11 supplies the broadcast program imagination data S35 to the flash memory 31 for storing.

3) A Construction of the Remote Commander 7

Figure 4:
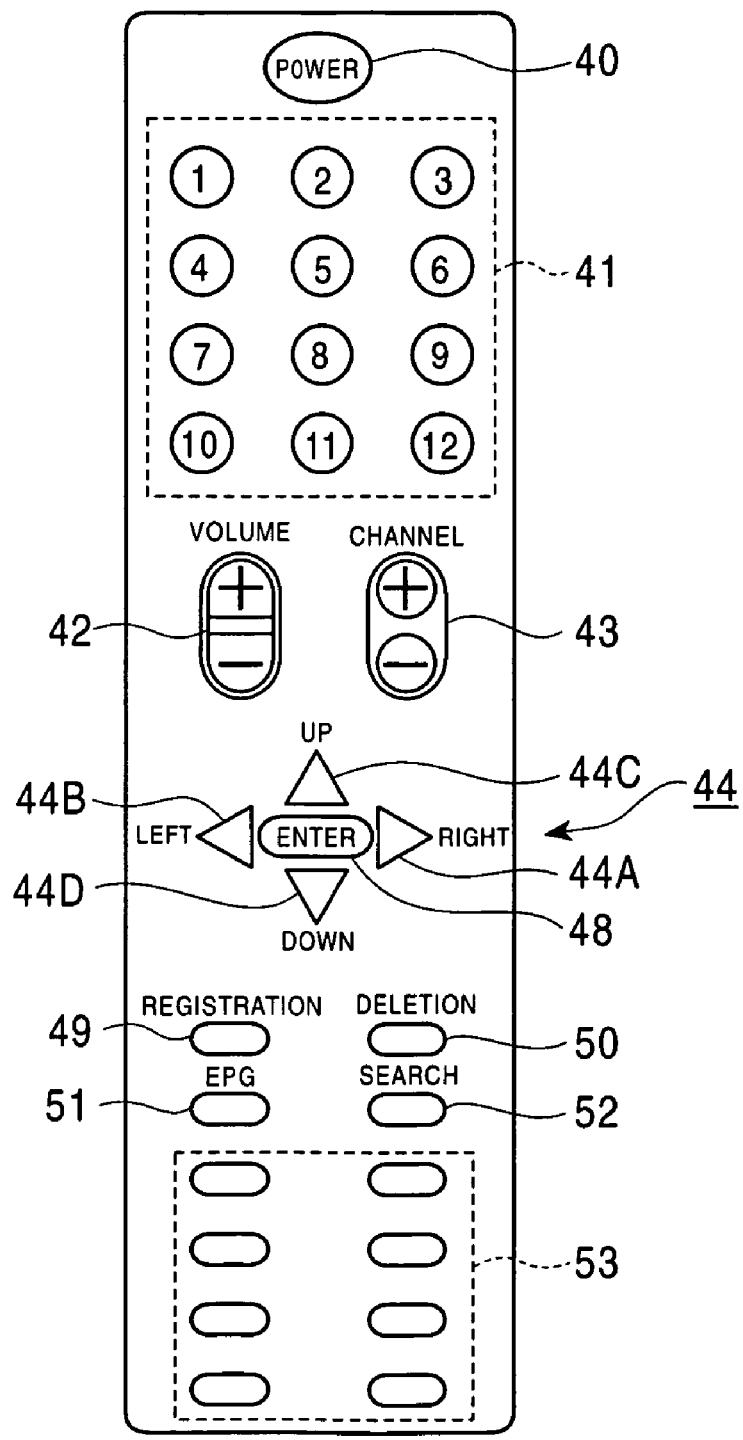
FIG. 4 is a surface configuration of a remote commander to be used in the present invention.

FIG. 4 shows a top face of the remote commander 7, and various operation keys are provided on this top face. On the upper side of the remote commander 7, a power key 40 for the IRD receiver 5, numeral keys 41 for selecting channels, a volume control key 42 and a channel selection key 43 for sequentially selecting receiving channels are provided as shown in FIG. 4. Further in the middle of the remote commander 7, a cursor move key 44 for moving a cursor displayed on the display screen 8A of the monitor 8 in the IRD receiver 5 is provided. The cursor move key 44 includes a move right key 44A, a move left key 44B, a move up key 44C, a move down key 44D and an enter key 48 are provided. The enter key 48 decides final cursor position selected by those cursor move keys 44A, 44B, 44C and 44D The remote commander 7 is further equipped with a key word registration key 49 for registration of keyword. The registered keyword is used as search key upon searching favorite programs among the EPG data S16. There are further provided a keyword delete key 50 for deleting keyword, an EPG image display key 51 and a keyword search image display key 52 for displaying keyword search image. The viewer (listener) uses this keyword search image when searching and registering keywords among the EPG data S16. Further in the lower part of the remote commander 7, there are provided various function keys 53 for controlling the IRD receiver 5.

4) A Keyword Registration Processing & a Keyword sSearch Processing

In this case of this embodiment, when the viewer (listener) designates desired word among the EPG image displayed on the display screen 8A of the monitor 8 using the cursor move key 44 of the remote commander 7, the IRD receiver 5 registers thus designated word as keyword. This registration process is done at respective IRD receiver 5 in advance. When the viewer (listener) wants to check broadcast programs of this week, for example, the IRD receiver 5 searches a particular broadcast program having explanation relating to words which are coincided with the previously registered keywords, and the search result is displayed on the display screen 8A of the monitor 8.

Figure 5:
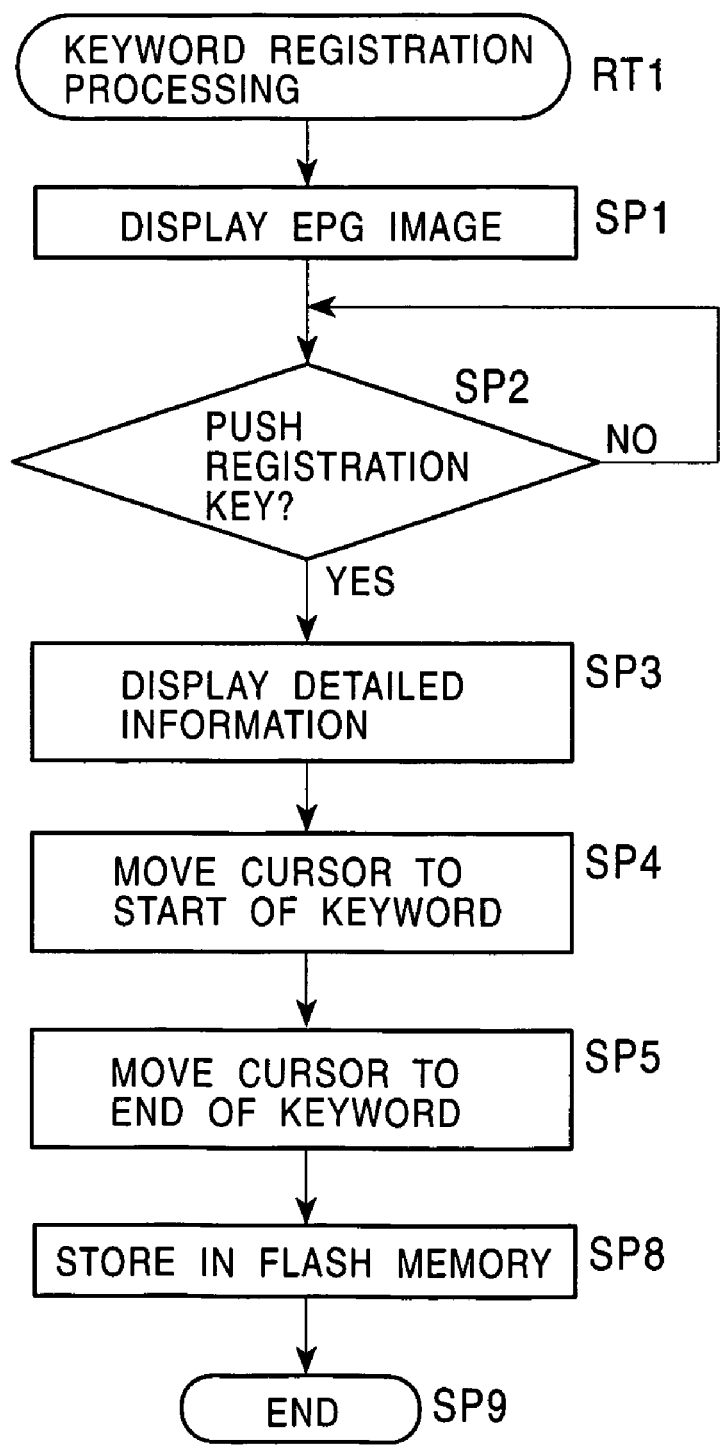
FIG. 5 is a flow chart showing key word registration processing of the present invention.

Namely, when the viewer (listener) operates the EPG image display key 51 of the remote commander 7 in order to register keywords, the CPU 11 of the IRD receiver 5 executes the keyword registration processing as shown in FIG. 5. In FIG. 5, when the CPU 11 enters a keyword registration processing RT1, the CPU 11 generates the EPG image data S17 from the EPG data S16 using the RAM 13 and supplies this EPG image data S17 to the monitor 8 by way of the graphic engine 26 and the RGB encoder 22 at a step SP1. On the display screen 8A of the monitor 8, there is displayed an EPG image 60 as shown in FIG. 6.

Then the CPU 11 moves the processing to a step SP2, where the CPU 11 checks until the viewer (listener) moves a cursor to the desired broadcast program among broadcast program list displayed on the display screen 8A using the cursor move key 44 of the remote commander 7 and then pushes the keyword registration key 49. When the keyword registration key 49 is pushed, the CPU 11 moves the processing to a step SP3. This means that some words to be registered as keywords are included in the explanation data of the selected broadcast program, and the CPU 11 displays a detailed information of the selected broadcast program such as [ Succor live ] at the bottom of the EPG image 60 as shown in FIG. 7.

When the viewer (listener) moves the cursor using the cursor move key 44 of the remote commander 7, the CPU 11 moves the processing to a step SP4. Namely, the cursor is positioned at start position of the desired word, [

[P̄erusa

Figure 8:
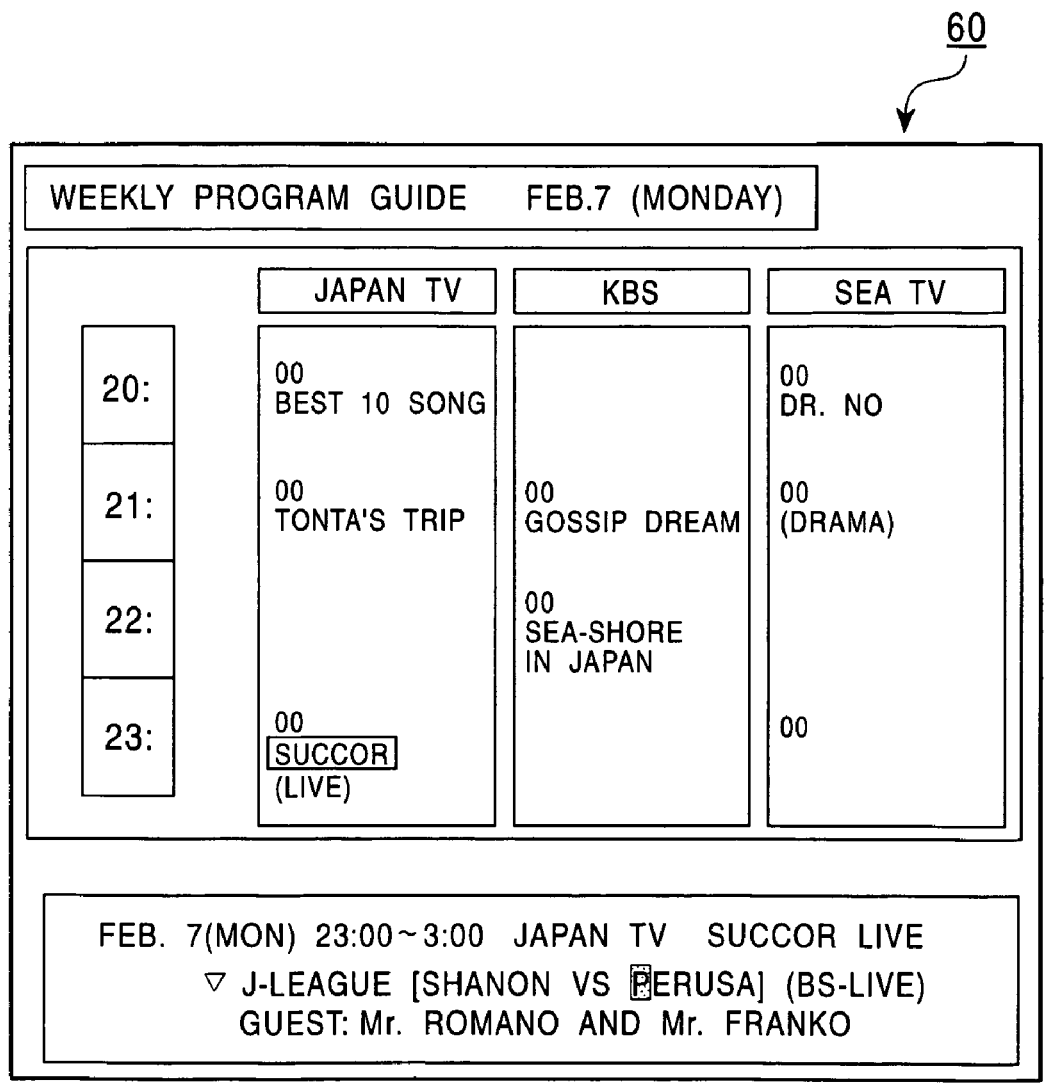

] in this example, included in the detailed information of the EPG image 60 as shown in FIG. 8.

Then the viewer (listener) moves the cursor to the end of the word using the cursor move key 44, particularly the move right key 44A in this case, of the remote commander 7. Namely, the CPU 11 moves the processing to a step SP5 where the cursor is moved to the end of the desired word, [

] in this example, as shown in FIG. 9.

Figure 10:
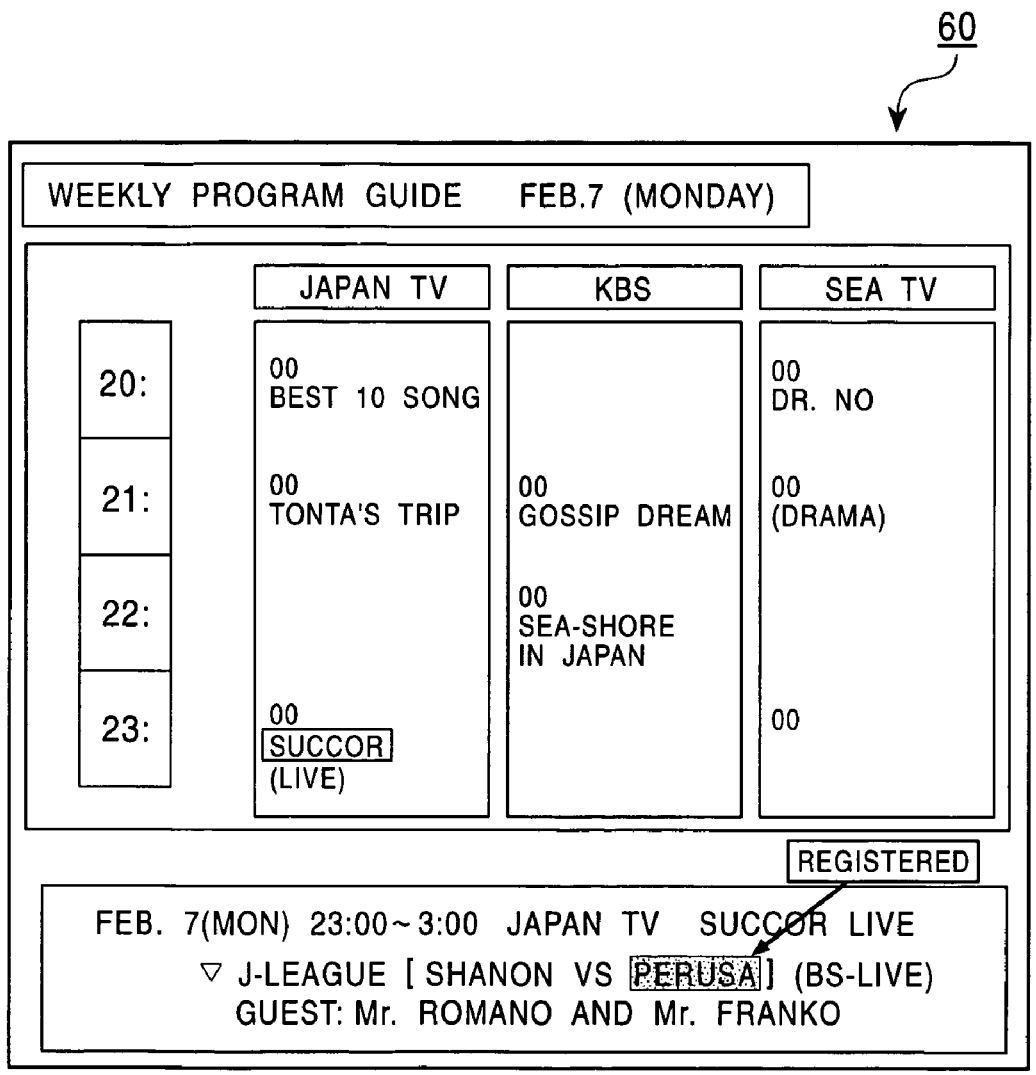

The CPU 11, when the viewer (listener) pushes the enter key 48 of the remote commander 7, recognizes the designated word among the detailed information displayed in the EPG image 60. Then the CPU 11 moves the processing to a step SP8 and the designated word [Perusa] is stored in the flash memory 31. Further the CPU 11 displays a message indicating the registration of the keyword on the EPG image 60 as shown in FIG. 10 and moves the processing to a step S10 to quit this keyword registration processing.

Thus the CPU 11 stores a plurality of keywords selected by the viewer (listener) in the flash memory 31 by repeating this keyword registration processing.

Figure 11:
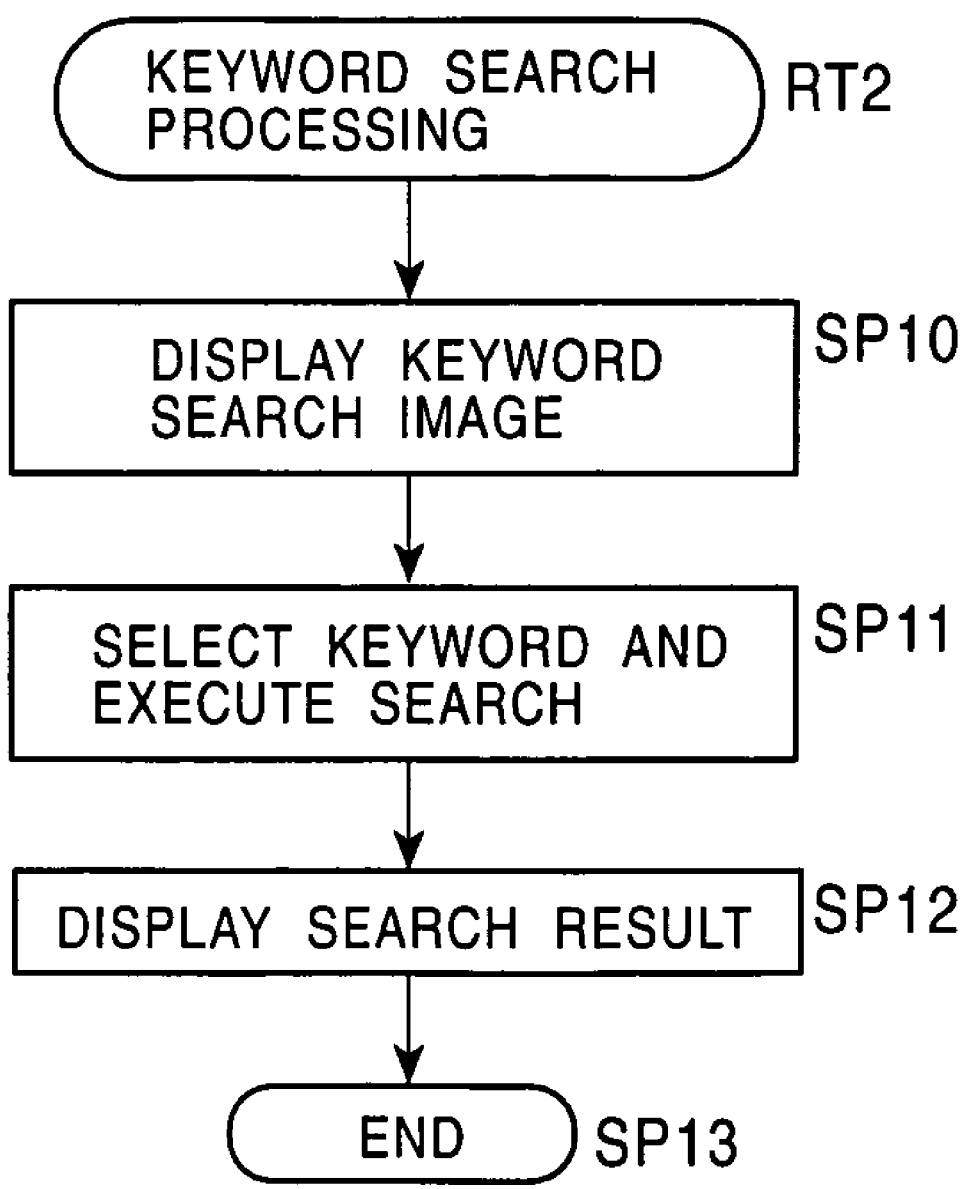
FIG. 11 is a flow chart showing a key word search processing.

Further when the viewer (listener) operates the keyword search image display key 52 of the remote commander 7, the CPU 11 of the IRD receiver 5 executes a keyword search processing RT2 such as shown in FIG. 11. Namely, in FIG. 11, the CPU 11 of the IRD receiver 5 moves the processing to a step SP10, where the CPU 11 reads out a keyword data S40 stored in the flash memory 31 and generates a keyword search image data S41 on the RAM 13 in association with thus read out keyword data S40. Further the CPU 11 supplies this keyword search image data S41 to the monitor 8 by way of the graphic engine 26 and the RGB encoder 22. And accordingly, as shown in FIG. 12, a keyword search image 61 showing keywords registered in the past is displayed on the display screen 8A of the monitor 8.

After that the CPU 11 moves the processing to a step SP11, where a favorite broadcast program of the viewer (listener) is selected. Namely, the CPU 11 moves the cursor to a selected keyword, [Perusa] in this example, in accordance with the operation of the cursor move key 44 of the remote commander 7 by the viewer (listener) as shown in FIG. 13 then executes a search processing for searching upon pushing a search execute button 62. In this case the viewer (listener) moves the cursor to the search execute button 62 on the display screen 8A then pushes the enter key 48.

In a step SP12, the CPU 11 displays a list of the broadcast programs having selected keywords in the detailed explanation as shown in FIG. 14 on the display screen 8A of the monitor 8. Then the CPU 11 moves the processing to a step SP13 to quit this processing.

Figure 18:
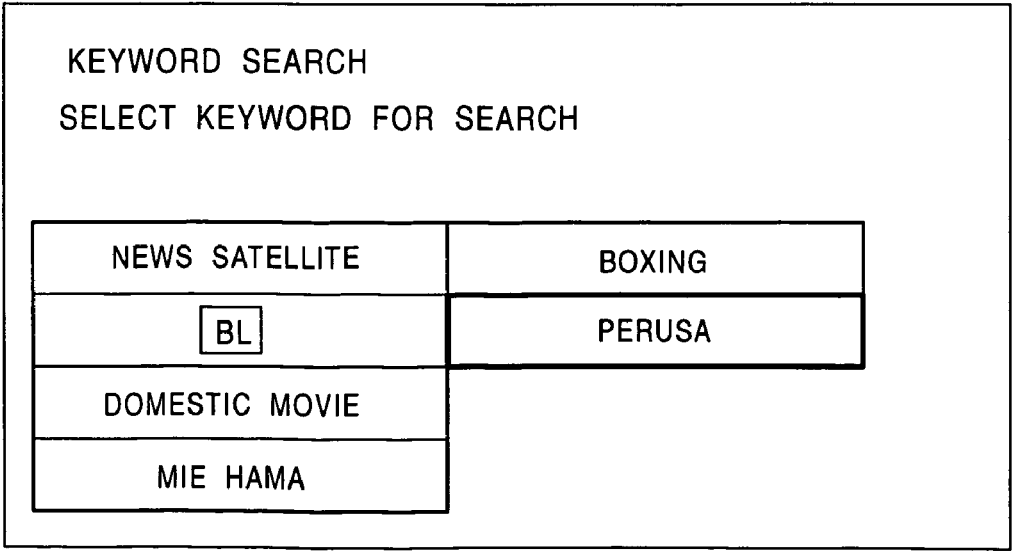

In the case where the viewer (listener) wants to delete previously registered keyword, the viewer (listener) uses a keyword delete key 50. When the keyword delete key 50 is pushed, the CPU 11 reads out registered keywords in the flash memory 31 and displays a keyword delete image 63 including these keywords on the display screen 8A of the monitor 8. In this condition, the viewer (listener) moves the cursor to the keyword to be deleted on the display screen 8A by using cursor move key 44 as shown in FIG. 18 and pushes the enter key 48 for selection. Then the viewer (listener) moves the cursor to a delete execute key 64 on the display screen 8A and pushes the enter key 48. In this way, the registered keyword can be deleted by the viewer (listener) using the remote commander 7.

In the above described example, when the viewer (listener) designates a desired word among words in the EPG image 60 displayed on the monitor screen 8A of the monitor 8 using the remote commander 7, the CPU 11 extracts a designated word among the EPG image 60 and registers in the flash memory 31 as a keyword for searching broadcast program.

Accordingly, the IRD receiver 5 can register the designated word as a keyword for searching favorite broadcast program of the viewer (listener) using only a remote commander 7. Namely, an input device such as a keyboard is not required in this embodiment of the present invention.

Based on this registered keyword, the CPU 11 is able to search a particular broadcast program which is coincided with the favorite broadcast program of the viewer (listener) among a large number of broadcast programs included in the EPG data S16 and the CPU 11 displays the search result on the display screen 8A of the monitor 8.

Accordingly, if the viewer (listener) registers personalities and or genre of the broadcast program in the flash memory 31 in accordance with the keyword registration processing as explained before, the viewer (listener) can search broadcast programs using thus registered keywords, even there is no additional keyword information in the EPG data S16.

In the above described example, the keyword is extracted from detailed information of the broadcast program displayed on the display screen 8A of the monitor 8 and registered in the flash memory 31, but a mark or sign of a broadcast program such as [NE] for news broadcast program, [BL] for bilingual broadcast program, [CA] for broadcast program with caption, etc. are able to be registered in the flash memory 31 as keywords for searching.

Further in the keyword search processing RT2, a broadcast program search is done using only one keyword among keywords displayed on the keyword search image 61, but more than one keyword can be used when the broadcast program search is done. Of course in this case, a broadcast program having detailed explanation that includes these plural keywords is searched. The Boolean algebra can be applied to those keywords upon searching operation.

In the above described embodiment of the present invention, a broadcast program search is done using only one keyword among keywords displayed on the keyword search image 61 and the search result is displayed on the display screen 8A of the monitor 8. But not only displaying the search result on the monitor 8 but also timer setting of desired broadcast program can be achieved in the another embodiment of the present invention.

Figure 16:
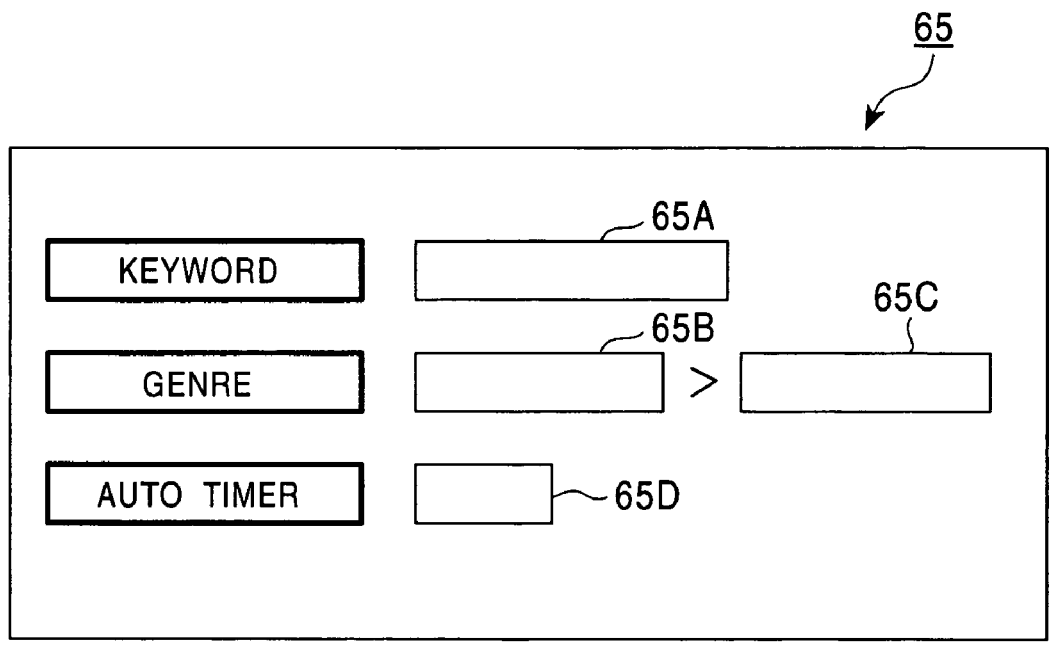
FIG. 16 is a conceptual display image on a display screen showing key word setting image of another embodiment of the present invention.

Further in the above case, the search processing RT2 is done based on only registered keywords, but this search processing RT2 can be done with search key that includes the registered keywords and additional keywords such as personalities and a genre of the broadcast program transmitted in the EPG data S16 from the broadcast station. In this case, when the viewer (listener) pushes the keyword search image display key 52 of the remote commander 7, the CPU 11 of the IRD receiver 5 displays a search key setting image 65 such as shown in FIG. 16 on the display screen 8A of the monitor 8. This search key setting image 65 is provided for setting a search key for searching a desired broadcast program among a large number of broadcast programs included in the EPG data S16.

Figure 17:
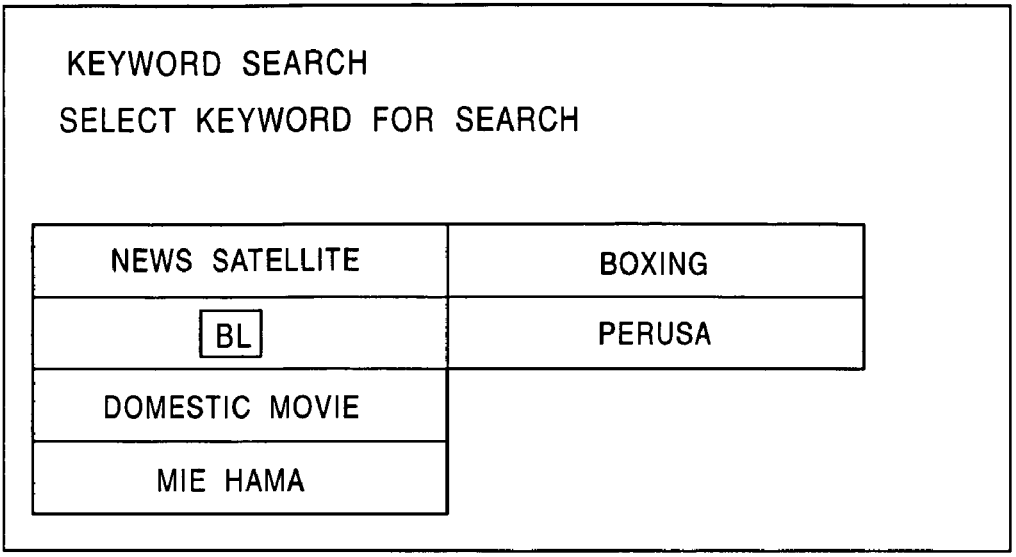
FIGS. 17 and 18 are conceptual display image on a display screen showing key word search image in the key word setting processing.

In this search key setting image 65, the viewer (listener) is able to input favorite keyword and genre and further is able to set timer recording. In this case, when the viewer (listener) moves the cursor to a keyword input area 65A and pushes the enter key 48 using the remote commander 7, the CPU 11 of the IRD receiver 5 reads out the keyword registered in the flash memory 31 and displays this keyword on the display screen 8A of the monitor 8 as shown in FIG. 17.

Figure 19:
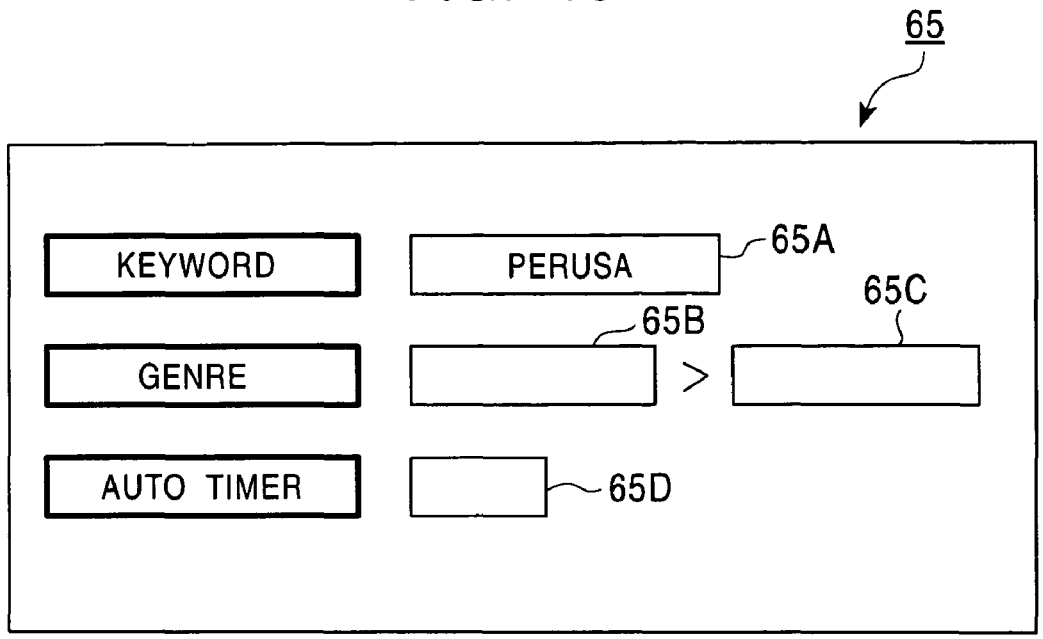
FIGS. 19 and 20 are conceptual display image on a display screen showing another embodiment of the search key setting image of the present invention.

When the viewer (listener) moves the cursor to a desired word, [Perusa] for example, among keywords displayed on the keyword search image 66 using the cursor move key 44 of the remote commander 7 as shown in FIG. 18 and pushes the enter key 48, the CPU 11 of the IRD receiver 5 sets the desired keyword in the keyword input area 65A as shown in FIG. 19.

Figure 20:
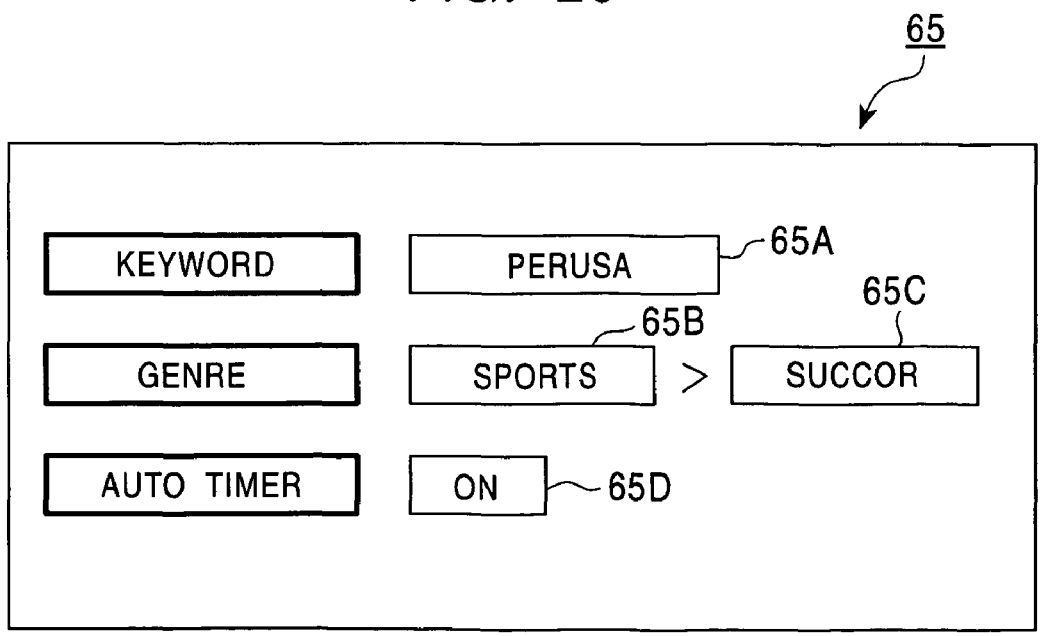

With similar operations as described above, when the viewer (listener) operates the remote commander 7, the CPU 11 of the IRD receiver 5 sets a rough genre of the broadcast program in a rough genre input area 65B, a detailed genre of the broadcast program in a detailed genre input area 65C and a necessity of the timer recording of the broadcast program in an auto timer recording setting area 65D as shown in FIG. 20.

After that the CPU 11 stores thus entered search key at the search key setting image 65 in the flash memory 31. In this situation, in the case the EPG data S16 stored in the RAM 13 is revised, the CPU 11 searches favorite broadcast program of the viewer (listener) based on the search keys stored in the flash memory 31 and displays the list of favorite broadcast programs and sets the timer recording for the broadcast program, if required.

According this embodiment of the present invention, the broadcast program search processing can be done using other search words in addition to a keyword transmitted from the broadcast station, so that more precise search result is obtained. Further in the embodiment as above described, a list of broadcast program title is displayed on the display screen 8A, but other headline title describing the contents of the broadcast program can be displayed on the display screen 8A of the monitor 8.

Of course, this invention is applied not only to the IRD receiver of the type ground wave analog broadcasting system but also to the other broadcast system such as the digital broadcast satellite system, the cable broadcast system and the Internet broadcast system.

While we have described and shown the particular embodiments of our invention, it will be understood that many modifications may be made without departing from the spirit thereof, and we contemplate by the appended claims to cover any modifications as fall within the true spirit and scope of our invention.

What is claimed is:

1. A method of processing program information, consisting essentially of the steps of:
controlling a display of the program information on a display unit;
controlling a display of a first cursor over text of the program information;
designating a first word in the text by a user placing the first cursor over the word;
starting a keyword registration process by pressing a keyword registration key on a remote commander;
displaying detailed program information of a user-selected program on the display of the program information;
controlling the display of a cursor over text in the detailed program information;
designating a start position and an ending position of a second word by moving a cursor from a first letter of the second word to an end letter of the second word in the text of the detailed program information;
storing the second designated word when a user pushes the enter key;
once the user stores the second word with the enter key, displaying a message indicating that the registration of keyword has been completed;
displaying a search image showing keywords previously registered; and
searching the program information based on the first designated word and the second designated word upon a pushing of a search execute button.

2. The method for processing program information as claimed in claim 1,
wherein the designating step designates the first designated word by the user moving the cursor from a start position to an end position of the first designated word.

3. The method for processing program information as claimed in claim 1,
wherein a plurality of words can be stored, and each of said plurality of words is included in said searching.

4. The method for processing program information as claimed in claim 1, further comprising the steps of:
navigating a list of a plurality of the stored words; and
searching the program information based on one or more words selected from the list by the user.

5. The method for processing program information as claimed in claim 1, further comprising the step of:
recording programs related to a search result obtained by said searching step.

6. The method for processing program information as claimed in claim 1, further comprising the step of:
receiving program information from a predetermined transmission station.

7. An information processing apparatus, comprising:
a first controlling unit configured to control displaying of program information on a display unit;
a second controlling unit configured to control displaying of a first cursor over text of the program information;
a first designating unit configured to designate a first word in the text,
wherein the first designated word having been designated by a user placing the first cursor over the word;
a third controlling unit configured to start a keyword registration process by pressing a keyword registration key on a remote commander;
a displaying unit for displaying detailed program information of a user-selected program on the display of the program information;
a fourth controlling unit for controlling the display of a second cursor over the text in the detailed program information;
a second designating unit for designating a start position and an ending position of a second designated word by moving a cursor from a first letter of the second word to an end letter of the second word in the text of the detailed program information,
wherein a storing unit stores the second designated word upon a user pushing the enter key;
a display unit for displaying a message indicating that the registration of keyword has been completed once the second word is stored and for displaying a search image showing keywords previously registered; and
a searching unit configured to search the program information based on the first designated word and the second designated word.

8. The information processing apparatus of claim 7,
wherein the first designating unit designates the first designated word by a user moving the cursor from a start position to an end position of the first designated word.

9. The information processing apparatus of claim 7,
wherein a plurality of words can be stored, and each of said plurality of words is included in said search.

10. The information processing apparatus of claim 7, further comprising:

a navigating unit configured to navigate a list of a plurality of the stored words; and the searching unit further configured to search the program information based on one or more words selected from the list by the user.

11. The information processing apparatus of claim 7, further comprising:

a recording unit configured to record one or more programs related to a search result obtained by said searching unit.

12. The information processing apparatus of claim 7, further comprising:

a receiving unit configured to receive program information from a predetermined transmission station.

13. A program receiving apparatus for storing a computer program on a computer readable medium, the computer program comprising the steps of:

receiving programs and program information;

controlling display of program information on a display unit;

controlling display of a first cursor over the text of the program information;

designating a first word in the text by a user placing the first cursor over the first word;

start a keyword registration process by pressing a keyword registration key on a remote commander;

displaying detailed program information of a user-selected program on the display of the program information;

controlling the display of a cursor over text in the detailed program information;

designating a start position and an ending position of a second word by moving a cursor from a first letter of the second word to an end letter of the second word in the text of the detailed program information;

storing the second designated word when a user pushes the enter key;

once the user stores the second word with the enter key, displaying a message indicating that the registration of keyword has been completed;

displaying a search image showing keywords previously registered; and searching the program information based on the first designated word and the second designated word.

* * * * *